Jan. 5, 1971 G. L. WOLANIN 3,552,816

PORTABLE PHONOGRAPH RECORD PLAYER

Filed Feb. 27, 1969 3 Sheets-Sheet 1

Inventor.
Gerald L. Wolanin.
By. Brown, Jackson, Boettcher & Dienner
Attys.

PORTABLE PHONOGRAPH RECORD PLAYER

Filed Feb. 27, 1969 3 Sheets-Sheet 2

Inventor
Gerald L. Wolanin
By Brown, Jackson, Boettcher & Dienner
Att'ys.

PORTABLE PHONOGRAPH RECORD PLAYER

Filed Feb. 27, 1969 3 Sheets-Sheet 3

Inventor
Gerald L. Wolanin
By Brown, Jackson, Boettcher & Dienner
Att'ys.

United States Patent Office
3,552,816
Patented Jan. 5, 1971

3,552,816

PORTABLE PHONOGRAPH RECORD PLAYER

Gerald L. Wolanin, Baroda, Mich., assignor to V-M Corporation, Benton Harbor, Mich., a corporation of Michigan Filed Feb. 27, 1969, Ser. No. 802,918
Int. Cl. A47b; G11b *1/00*
U.S. Cl. 312—8 13 Claims

ABSTRACT OF THE DISCLOSURE

A phonograph record player of the type comprising a generally upright carrying case or housing having front and back walls and spaced side walls and a turntable tray or base positioned in, and forming a closure portion of, an enlarged opening in the front wall of the carrying case or housing. A double-pivot arrangement is used to support the turntable base between the side walls of the carrying case or housing for movement between a generally upright storage position and a generally horizontal record playing position. Portions of the turntable tray or base are adapted to unlatch latching means which are operative between movable speaker enclosures and the housing when the turntable tray or base is moved to the generally horizontal record playing position.

BACKGROUND OF THE INVENTION

This invention pertains generally to phonograph record players and more particularly to portable phonograph record players of the type comprising a generally upright carrying case or housing and a turntable tray or base positioned in an enlarged opening in the front wall of the carrying case or housing and pivotally supported between the side walls of the carrying case or housing for movement between a stable generally upright storing position and a stable generally horizontal record playing position. The turntable base carries a turntable, a tone arm having an associated stylus, and other component parts of record playing and changing mechanism, and the "bottom" of the tray or base forms part of the front wall of the housing when the tray is in its upright position.

It is conventional for such a turntable base to be pivotally supported between the side walls of the housing by means of fixed pivot pins extending from opposite side portions of the turntable base and engaging fixed pivot bearings on the side walls of the housing. Thus, the turntable base may be tilted upwardly to the generally upright storing position and downwardly to the generally horizontal record playing position. As pointed out in my copending application Ser. No. 802,043 filed Feb. 25, 1969, such pivotal means set restrictions on the ability to make the housing thinner and at the same time provide needed stability when the turntable tray is tiled down to its generally horizontal record playing position.

Conventionally, a portable phonograph record player of this type has a pair of speaker casings or enclosures which may contain stereophonic speakers. The speaker enclosures are mounted to the housing on vertical hinges, or the like, for pivotal movement away from the respective side walls of the housing to extended positions flanking the housing so that the sound of the music can be directed to the listener. Alternately the speakers may be moved toward the respective side walls of the housing to retracted positions against the housing to provide a compact arrangement for carrying the record player and its speakers. Often, trunk latches or the like are used to hold the speaker enclosures in the retracted positions. Such latches are not usually attractive looking and not infrequently are not correctly used, with the result that when the record player is picked up to be transported the speaker enclosures swing away from the housing and may injure the hinges and also may themselves become damaged by hitting some object.

SUMMARY OF THE INVENTION

It is the principal object of this invention to provide improvements in a portable phonograph record player of the aforementioned type.

To that end it is an object of this invention to provide a portable phonograph record player of the aforementioned type in which improved latching means are operative between the respective speaker enclosures and the housing. As more fully disclosed hereinafter, I propose the use of latching means which is scarcely noticeable and which is easier to use and semi-automatic in its operation.

It is a more particularly object of this invention to provide such a portable phonograph record player, in which portions of the turntable base are adapted to effect unlatching of the respective latching means when the turntable base is moved to the generally horizontal record playing position.

Preferably, the latching means comprise protruding latch members carried by the respective speaker enclosures and adapted to pass through apertures in the respective side walls of the housing to automatically effect latching relations of the speaker enclosures to the side walls of the housing when the speaker enclosures are moved to the retracted positions. The respective protruding latch members are resilient and have offset portions adapted to engage the inner margins of the respective apertures when passed through the respective apertures. Portions of the turntable base are adapted to engage the respective latch members and bend the respective latch members when the turntable base is moved to the record playing position, thereby disengaging the offset portions of the respective latch members from the inner margins of the respective apertures and thereby permitting the latch members to be withdrawn from the apertures. When the portable record player has its turntable base tilted up to the storage position, preparatory to transporting the record player, the turntable base no longer provides any unlatching action for the latch means so that the speaker enclosures may be swung to their retracted positions against the sides (ends) of the housing and be automatically latched in that position.

By the use of a unique pivotal arrangement, disclosed more fully and claimed in my copending application Ser. No. 802,043, filed Feb. 25, 1969, the turntable base provides a unique unlatching action to release the latches which secure the speaker enclosures to the housing, at such time as the turntable base reaches the end of its pivotal movement to the record playing position.

These and other objects, features, and advantages of this invention will be evident from the following description, with the aid of the attached drawings, of a presently preferred embodiment of this invention.

DESCRIPTION OF THE PREFERRED EMBODIMENT

Figure 1:
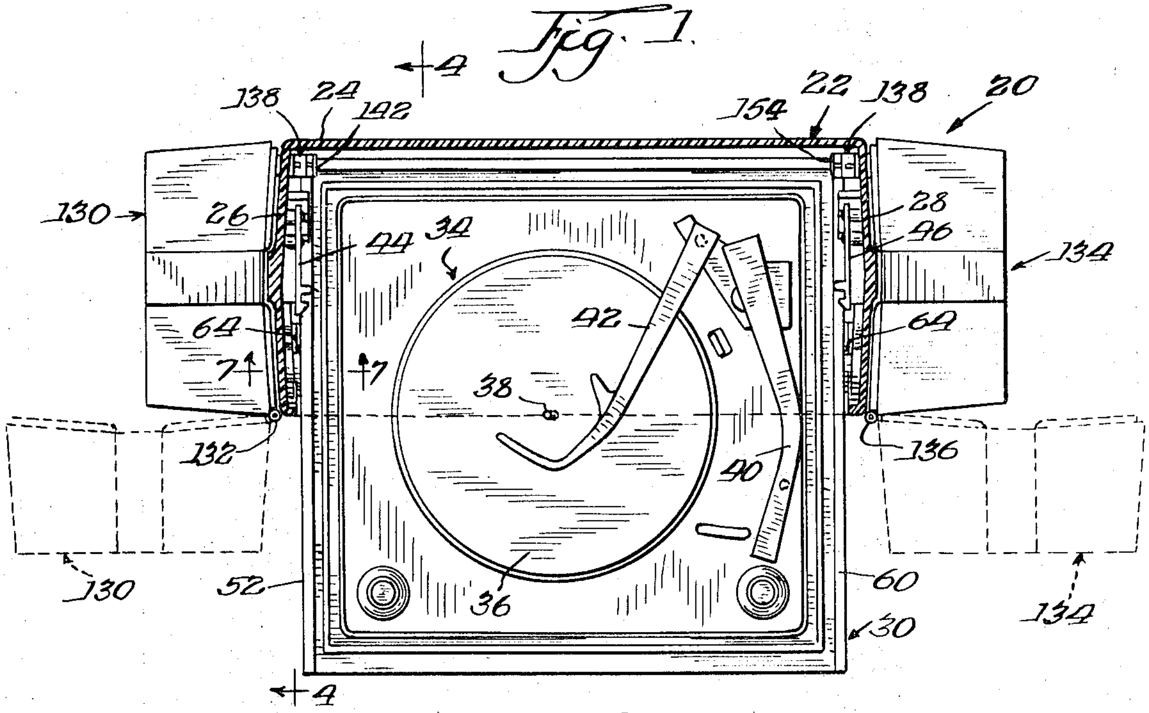
FIG. 1 is a plan view, with certain parts broken away, of a portable phonograph record player embodying the principles of this invention, taken substantially along line 1—1 of FIG. 2 and looking in the direction of the arrows, showing the turntable, or tray, in a tilted-down, generally horizontal, position suitable for playing of records.

As shown in the drawings, the principles of this invention are embodied in a portable phonograph record player, indicated generally at 20, comprising a carrying case or housing 22, which somewhat resembles a suitcase and has a plurality of walls including a back wall 24 and spaced side walls 26 and 28, and a turntable tray or base 30, which is positioned in an enlarged rectangular opening 32 in the front of the housing 22. When the turntable base 30 is in the generally upright, storage position, it forms substantially the entire front wall of the housing 22. The turntable base 30 is pivotally supported between the side walls 26 and 28, in a manner to be described hereinafter, for movement between a generally horizontal record playing position. The turntable base 30 is shown in the storage position in FIG. 4, and in the record playing position in FIGS. 1–3. The housing 22 and the turntable base 30 are shown made of molded plastic, but they may be made of other materials.

For present purposes, it should be understood that the turntable base 30 carries and supports a number of known component parts of mechanism for playing and changing records, indicated generally at 34, including a rotatably mounted turntable 36 having a concealed drive motor, a center spindle 38, a pivotally mounted tone arm 40 having an associated stylus (not shown), and a record steadying arm 42. Details of the structure and function of suitable mechanism for use as the record playing and changing mechanism 34 are not needed for an understanding of the present invention and may be supplied readily by those skilled in the art.

Figure 2:
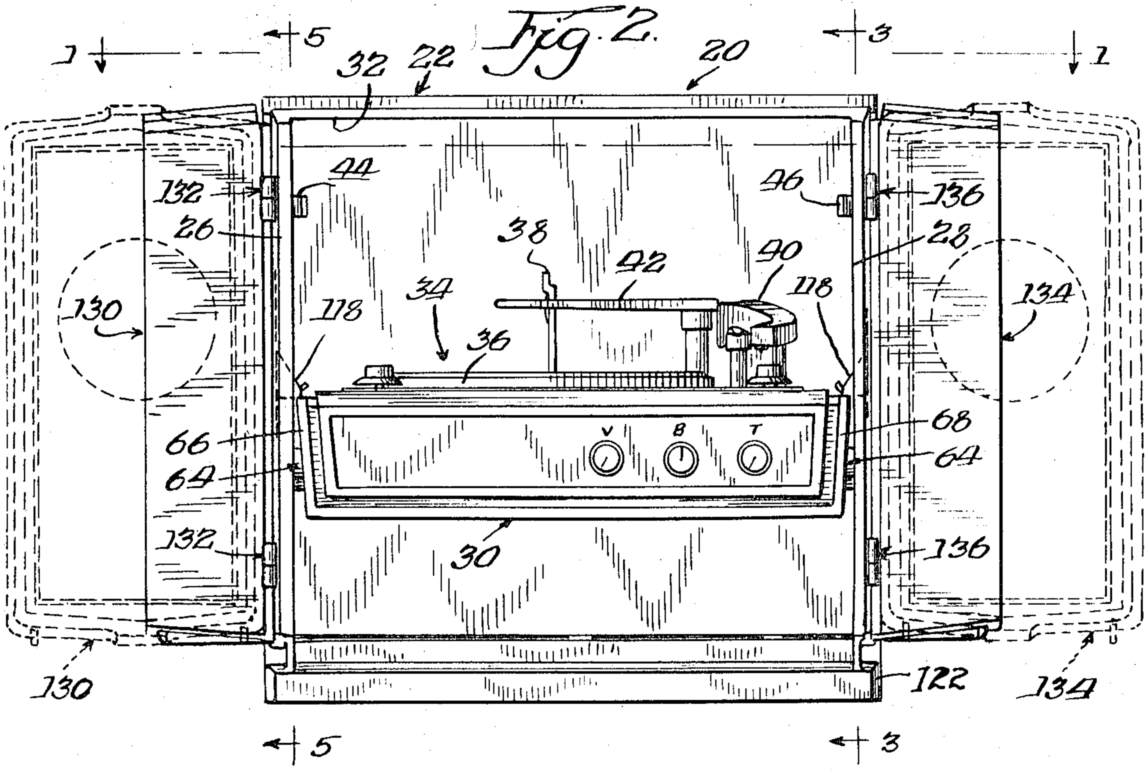
FIG. 2 is a front elevational view of the portable phonograph record player of FIG. 1.
Figures 3, 4, 5, 6:
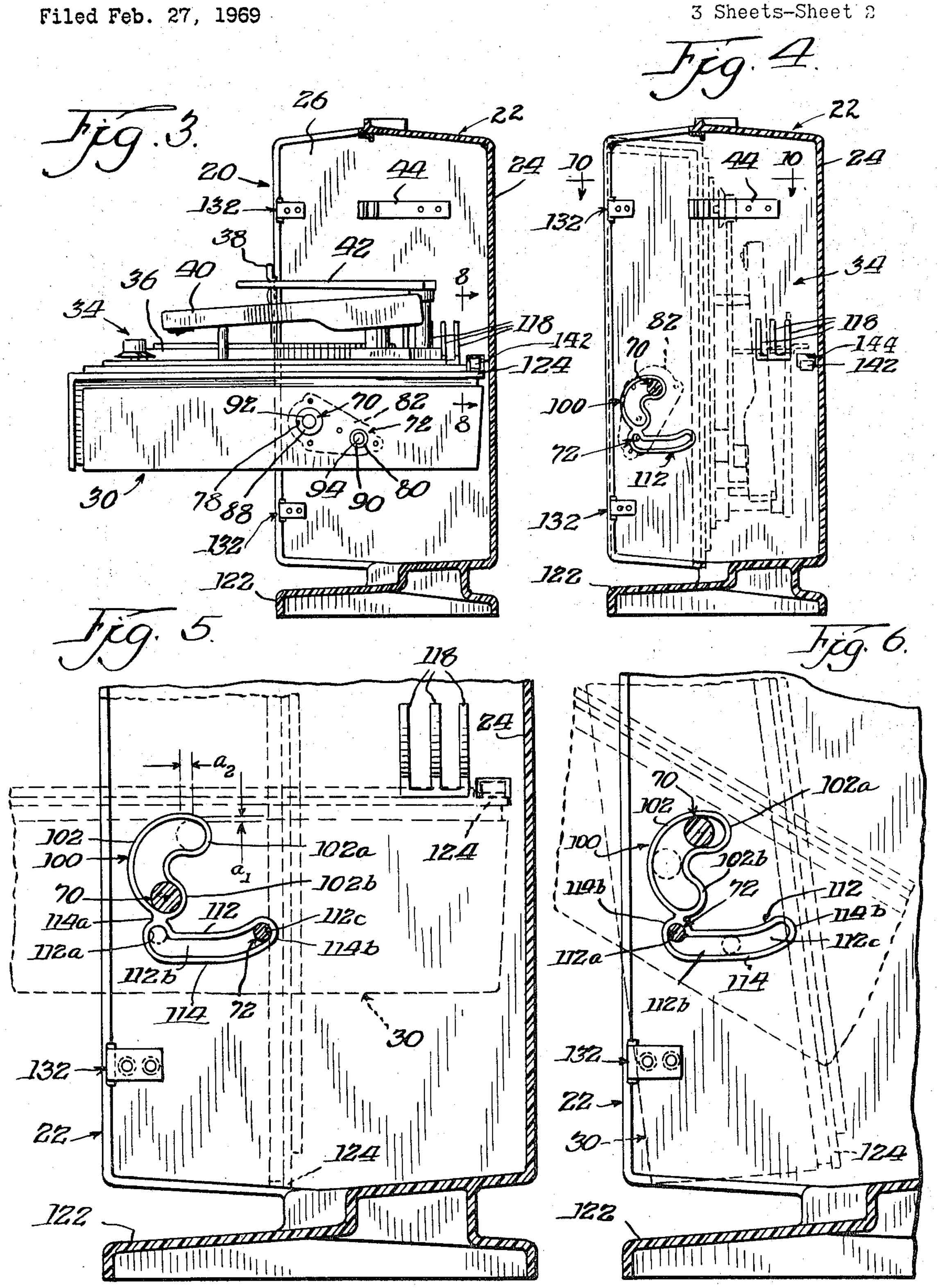
FIG. 3 is a sectional view, taken substantially along line 3—3 of FIG. 2, looking in the direction of the arrows.
FIG. 4 is a sectional view, taken substantially along the offset line 4—4 of FIG. 1 and looking in the direction of the arrows, showing the turntable base in a tilted-up position.
FIG. 5 is a fragmentary sectional view, on an enlarged scale, taken substantially along line 5—5 of FIG. 2 and looking in the direction of the arrows, indicating the limits of movement of the turntable base.
FIG. 6 is a fragmentary sectional view, similar to FIG. 5, showing the turntable in intermediate positions of pivotal movement.
Figure 10:
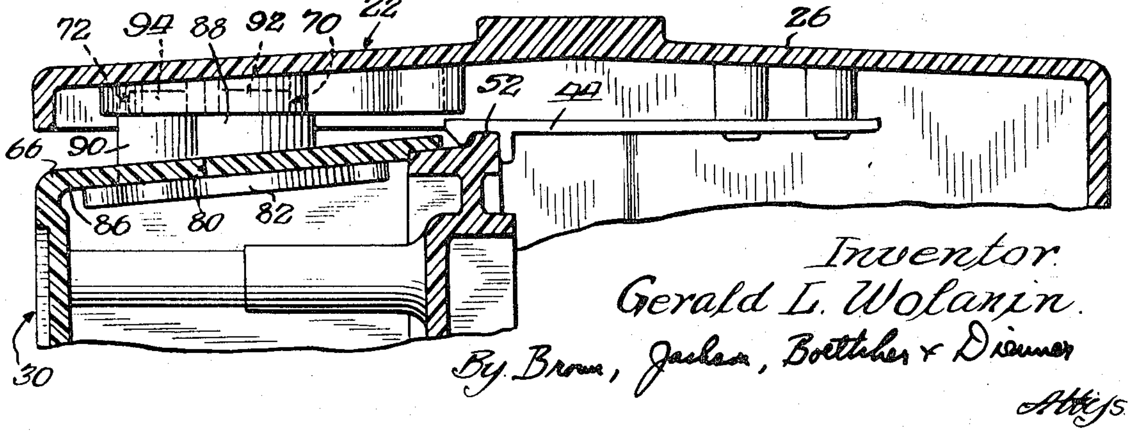
FIG. 10 is an enlarged, fragmentary sectional view, taken substantially along line 10—10 of FIG. 4 and looking in the direction of the arrows.

As shown in FIG. 4, in order to protect the aforementioned otherwise exposed component parts of the mechanism 34, the turntable base 30 fits closely within the opening 32 in the housing 22 when moved to the generally upright storage position and thereby forms the front wall of the housing 22. The turntable base 30 is retained in the generally upright storing position by means of a pair of similar resilient clips 44 and 46, respectively (see FIGS. 2, 3, 4 and 10) riveted or otherwise suitably mounted in cantilevered relation to the respective side walls 26 and 28. The clip 44 is adapted to be snapped into or out of engagement with a rib 52 (FIGS. 1 and 10) formed on one lateral edge of the turntable base 30 upon the application of a slight amount of force to the turntable base 30. The clip 46 is adapted to be similarly snapped into and out of engagement with a rib 60 (FIG. 1) formed on the opposite lateral edge of the turntable base 30.

Figures 7, 8, 9:
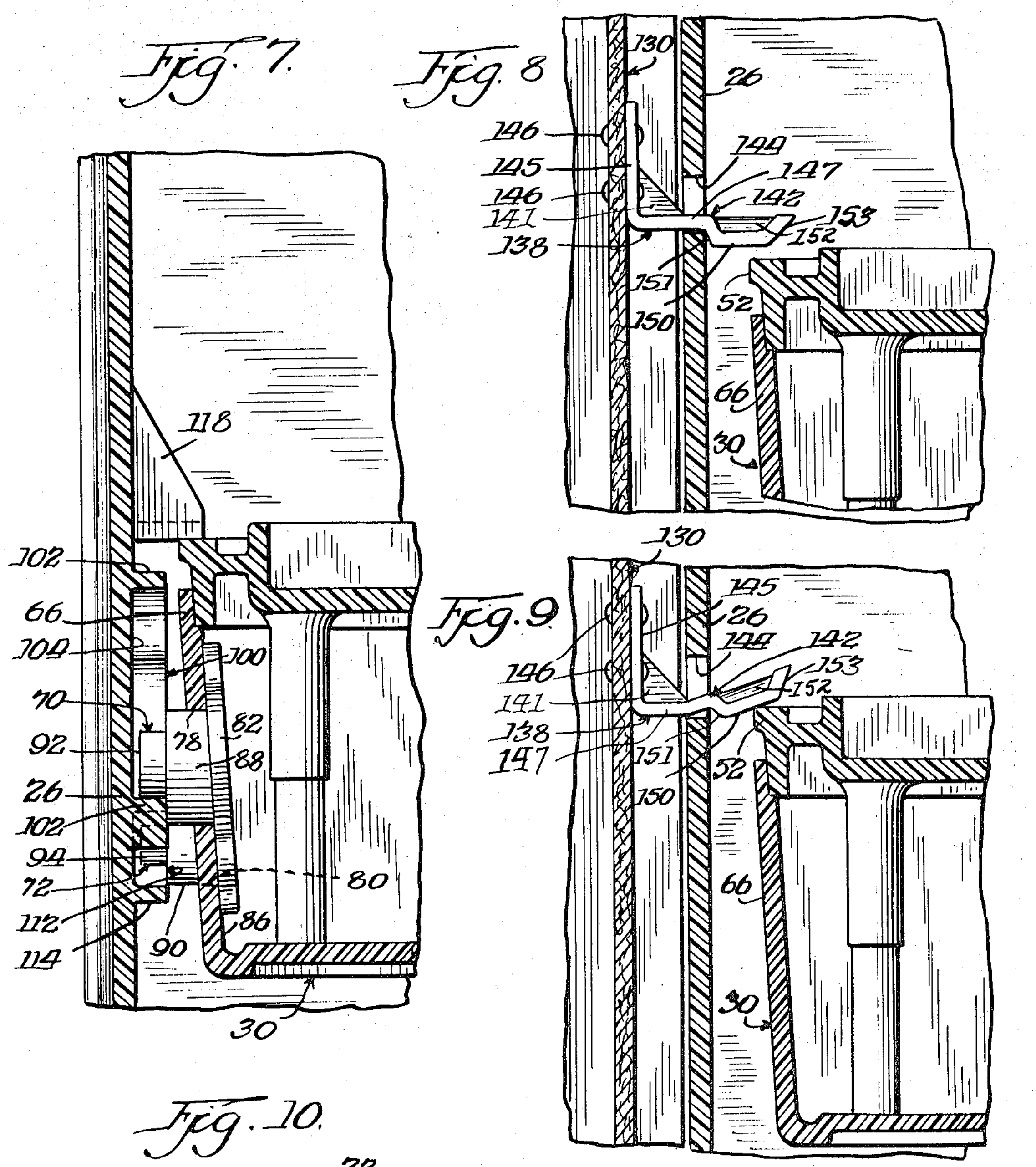
FIG. 7 is an enlarged, fragmentary sectional view, taken substantially along line 7—7 of FIG. 1 and looking in the direction of the arrows, showing the turntable base in the tilted-down position.
FIG. 8 is an enlarged, fragmentary sectional view, taken substantially along line 8—8 of FIG. 3 and looking in the direction of the arrows, showing the turntable base in an intermediate position, nearing its record playing position.
FIG. 9 is an enlarged, fragmentary sectional view, similar to FIG. 8, showing the turntable base in the tilted-down, record playing position.

The turntable base 30 is pivotally supported between the side walls 26 and 28 of the housing 22 by means of a unique double-pivot arrangement, indicated generally at 64, 64 (FIGS. 1 and 2). The side walls 66 and 68 of the turntable base 30 may have a slight draft or taper, as shown, owing to the molding processes by which the turntable base 30 may be fabricated. The double-pivot arrangement 64, 64, by means of which the turntable base 30 is supported between the side walls 26 and 28 of the carrying case or housing 22, is formed by aligned pivot means 70 and aligned guide means 72 (the latter also serving as pivot means), both means 70 and 72 being mounted to each of the respective side walls 66 and 68 of the turntable base 30. As shown in FIGS. 3 and 7, the side wall 66 of the turntable base 30 has an enlarged horizontally extending, circular opening 78 and a slightly smaller, horizontally extending, circular opening 80 in predetermined spaced relation to the opening 78. A backing plate 82 is rigidly attached to the inside surface 86 of the side wall 66, by means of a plurality of screws (not shown), and is formed with an integral cylindrical spacer 88 extending outwardly through the opening 78 and a slightly smaller integral cylindrical spacer 90 extending outwardly through the slightly smaller opening 80. The pivot means 70 mounted to the side wall 66 of the turntable base 30 is in the form of a cylindrical pivot boss 92, of reduced diameter, integrally formed on the cylindrical spacer 88, and the guide means 72 mounted to the side wall 66 of the turntable base 30 is in the form of a cylindrical pivot boss 94, of reduced diameter, integrally formed on the cylindrical spacer 90. The pivot means 70 and guide means 72 mounted to the opposite side wall 68 are similarly formed.

The pivot means 70 engage and are supported by pivot track means 100 carried by the respective side walls 26 and 28 of the carrying case or housing 22. As shown, the pivot track means 100 carried by the side wall 26 of the housing 22 is formed by a raised flange 102, preferably molded on the inside surface 104 of the side wall 26, defining a substantially arcuate path of movement of the pivot means 70 which is mounted to the side wall 66 of the turntable base 30. The pivot track means 100 carried by the opposite side wall 28 is similarly formed, and cooperates with its associated pivot means 70. The guide means 72 engage and are supported by guide track means 112 carried by the respective side walls 26 and 28 of the carrying case or housing 2. As shown, the guide track means 112 carried by the side wall 26 of the housing 22 is formed by a raised flange 114, preferably molded on the inside surface 104 of the side wall 26, defining a path of movement for the guide means 72 mounted to the side wall 66 of the turntable base 30 which includes an upturned end **112*a* followed by a generally horizontal path 112*b* which enters into an upturned end 112*c*. The guide track means 112 carried by the opposite side wall 28 of the housing is similarly formed and each guide track means is formed by a raised flange 114 on the inside surface of the side wall 26 and 28**.

The respective pivot track means 100 and the respective guide track means 112 on each side wall of the housing are contoured by their respective flanges 102 and 114 to determine the path of movement of the turntable base 30 is either direction between the generally upright storage position and the generally horizontal record playing position, and, furthermore, require movement of the respective pivot means 70 outwardly and downwardly with respect to the housing 22, along the respective pivot track means 100, for movement of the turntable base 30 from the generally upright storage location toward the generally horizontal record playing location. Thus as shown in FIG. 4, when the turntable base 30 is in the generally upright storage position, the respective pivot means 70 are at the upper extremities of the respective pivot track means 100, and the respective guide means 72 are at the outer extremities of the respective guide track means 112. Portions **102*a* and 102*b* of flange 102 form stop means for the cooperating pivot means 70; and portions 114***a* and 114*b* of flange 114 form stop means for the cooperating guide means 72. Similarly, as shown in FIG. 5, when the turntable base 30 is in the generally horizontal record playing position, the respective pivot means 70 are at the lower extremities of the respective pivot track means 100, and the respective guide means 72 are at the inner extremities 112*c* of the respective guide track means 112. Stopping of the pivotal movement of turntable base 30 at the generally horizontal record playing position also is controlled by integral stop means 118 on the respective side walls 26 and 28 of the housing 22. Movement of the turntable base 30 to the generally upright storage position also is limited by engagement of the turntable base 30 with the housing 22.

Because an outward component of movement of the pivot means 70 with respect to the housing 22 is required for movement of the turntable base 30 from the generally upright storage position toward the generally horizontal record playing position, less depth is required in the interior of the carrying case or housing 22 than would be required if the turntable base 30 were to be supported by means of conventional fixed pivots.

The respective pivot track means 100 and the respective guide track means 112 are contoured so as to cause one edge 124 of the turntable base 30—which edge 124 constitutes the inner edge of the turntable base 30 when the turntable base 30 is in the generally horizontal record playing position—to be moved simultaneously to its uppermost position and to its innermost position as the turntable base 30 makes its final pivotal movement to the generally horizontal record playing position. This movement is useful in connection with the operation of latching means for speaker enclosures which are hingedly connected with the housing 22 as is set forth in greater detail below.

The record player 20 further comprises a speaker enclosure 130 mounted to the side wall 26 of the housing 22, by means of a pair of vertical hinges 132. The hinged support permits movement away from the side wall 26 to an extended position flanking the housing 22 (see the dash line position of FIGS. 1 and 2) and movement toward the side wall 26 to a retracted position against the side wall 26. Similarly a speaker enclosure 134 may be mounted to the side wall 28 of the housing 22, by means of a pair of vertical hinges 136, for movement away from the side wall 26 to an extended position flanking the carrying case or housing 22 and toward the side wall 28 to a retracted position against the side wall 28. The speaker enclosures 130 and 134 may contain stereophonic speakers. In FIGS. 1 and 2, the speaker enclosures 130 and 134 are shown in the extended positions in dashed lines and in the retracted positions in full lines. Latching means, indicated generally by the reference numeral 138 in FIGS. 8 and 9 may be used to hold the speaker enclosures 130 and 134 in their retracted positions against the side walls 26 and 28, respectively, of the housing.

The latching means 138 which is operative between the speaker enclosure 130 and the housing 22 comprises a protruding latch member 142 carried by the speaker enclosure 130 and adapted to pass through an aperture 144 in the side wall 26 of the housing 22 to effect a latching relation of the speaker enclosure 130 to the side wall 26 when the speaker enclosure 130 is moved to the retracted position. The latch member 142 is resilient and is mounted in cantilevered relation to the speaker enclosure 130 by an arm 145, stiffening web 141, and rivets 146. The other arm 147 of latch member 142 has a downwardly directed offset portion 150 providing a cam surface 151 which is adapted to engage the inner margin of the aperture 144, when passed through it, and to cam the speaker enclosure 130 home against the housing 22. A strengthening web 152 is disposed across the channel of the offset portion 150. The free end of arm 157 of latch member 142 has a cam surface 153 which is adapted to engage the edge of aperture 144 to cause the resilient offset portion 150 to be cammed vertically to permit it to enter the aperture and reach its latching position. The latching means 138 operative between the speaker enclosure 134 and the housing 22 comprises a similar latch member 154 carried by the speaker enclosure 134 and adapted to pass through an aperture (not shown) in the side wall 28 of the housing 22 to effect a latching relation of the speaker enclosure 134 to the side wall 28 when the speaker enclosure 134 is moved to the retracted position. It will be appreciated that the latches 142 and 154 could be arranged to be associated with some other surface internally of the housing 22 to provide a latching operation.

When the speaker enclosures 130 and 134 are in their retracted positions and the offset portions of the respective latch members 142 and 154 are engaged with the inner margins of their respective apertures, the offset portions of the respective latch members 142 and 154 lie slightly below the aforementioned stop means 118. Thus, when the turntable base 30 is moved to its record playing location and into engagement with the stop means 118, the respective ribs 52 and 60 on the turntable base 30 engage the respective latch members 142 and 154 and bend them upwardly, as in FIG. 9, and thereby not only disengage the offset portions of the respective latch members 142 and 154 from the inner margins of the associated apertures, but also effect a camming action against the latches and cause them and the speaker enclosures to move away from the side walls of the cabinet.

The latching means is farther from the hinges of each speaker enclosure than is the center of gravity of the speaker enclosure. Preferably the projecting latch member 142 is adjacent the rear of the enclosure 134 and the aperture 144 is adjacent the rear wall 24 of the housing 22. With such location of the latching means it is secure against disengagement which might otherwise occur if the speaker enclosure is jarred.

It will be appreciated that while the objects, features and advantages of the invention have been demonstrated in the disclosed preferred form, they may also be embodied in other forms of record players, so the scope of this invention should be determined from the following claims.

What is claimed is:

1. A phonograph record player comprising a generally upright housing having spaced side walls, a turntable base pivotally supported between said side walls for movement between a generally upright storage position and a generally horizontal record playing position, at least one speaker enclosure mounted to said housing of the record player for movement away from one side wall of said housing to an extended positioen flanking said housing and toward said one side wall to a retracted position against said housing, and latching means operative between said speaker enclosure and said record player when said speaker enclosure and said record player when said speaker enclosure is in said retracted position, an aperture in said one side wall of the housing, said latching means comprising a protruding latch member carried by said speaker enclosure and adapted to pass through said aperture to effect a latching relation of said speaker enclosure to said record player when said speaker enclosure is moved to said retracted position, and means for releasing said latching means.

2. A phonograph record player comprising a generally upright housing having spaced side walls, a turntable base pivotally supported between said side walls for movement between a generally upright storage position and a generally upright storage position and a generally horizontal record playing position, at least one speaker enclosure mounted to said housing of the record player for movement away from one side wall of said housing to an extended position flanking said housing and toward said one side wall to a retracted position against said housing, and latching means operative between said speaker enclosure and said record player when said speaker enclosure is in said retracted position, and means operatively associated with said turntable base adapted to effect unlatching of said latching means as said turntable base is moved to said record playing position.

3. The phonograph record player of claim 2 wherein there are a pair of movable speaker enclosures each of which is hingedly mounted on the housing and each of which has a retracted position and latching means.

4. The phonograph record player of claim 2 wherein there is an aperture in said one side wall of the housing, and said latching means comprises a protruding latch member carried by said speaker enclosure and adapted to pass through said aperture to effect a latching relation of said speaker enclosure to said record player when said speaker enclosure is moved to said retracted position.

5. The phonograph record player of claim 4 wherein said protruding latch member has an offset portion adapted to engage the inner margin of said aperture to effect a latching action when the offset portion passes through said aperture.

6. The phonograph record player of claim 5 wherein said protruding latch member is a resilient member having a cam surface which engages the edge of the aperture to cam the latch member laterally to permit the offset portion to reach its latching position.

7. The phonograph record player of claim 5 wherein it is a surface of said turntable base which is adapted to disengage said offset portion of said latch member from the inner margin of said aperture and thereby permit said latch member to be withdrawn from said aperture.

8. The phonograph record player of claim 5 wherein a surface of the turntable base engages the offset portion of said latch member to cause it to become disengaged from the inner margin of said aperture and to cam said latch member and the movable speaker enclosure away from the wall of the housing.

9. The phonograph record player of claim 2 further comprising pivot track means, and cooperating pivot means movable relative to said pivot track means, one of said means being carried on opposite sides of the turntable base and the other of said means being carried by the housing, said pivot track means affording an upper position for the pivot means, at which position the turntable base is in its storage location, and a lower position for the pivot means, at which position the turntable base is in its lowered record playing location, guide track means, and cooperating guide means movable relative to said guide track means, one of said latter two means being carried by at least one of the sides of the turntable base and the other of said latter two means being carried by the housing, said pivot track means and said guide track means being contoured to require movement of the turntable base outwardly and downwardly with respect to said housing as said pivot means and said guide means move along their respective pivot track means and guide track means eduring movement of said turntable base from its storage position toward its record playing location.

10. The improvement of claim 9 wherein the pivot track means provides a substantially arcuate path for the pivot means and the guide track means provides a path for the guide means.

11. The improvement of claim 10 wherein the pivot track means and the guide track means are contoured to require final movement of the turntable base rearwardly and then upwardly with respect to the housing when moving from its storage position toward its record playing position to cause engagement of the turntable base with the latching means in order to effect unlatching action.

12. The phonograph record player of claim 4 wherein the speaker enclosure is hingedly connected to the side wall of the housing at the front part of the side wall and has its center of gravity rearwardly of said hinged connection, and wherein the latch member is further to the rear of the speaker enclosure than is the enclosure's center of gravity.

13. The phonograph record player of claim 12 wherein the latch member is adjacent the rear edge of the speaker enclosure and the aperture in the side wall of the housing is adjacent the rear wall of the housing.

References Cited

UNITED STATES PATENTS

| | | | |
|---|---|---|---|
| 3,352,613 | 11/1967 | Morris et al. | 312—8 |
| 3,460,839 | 8/1969 | Benty | 312—8X |
| 3,489,472 | 1/1970 | Keminski et al. | 312—8 |

JORDAN FRANKLIN, Primary Examiner

G. V. LARKIN, Assistant Examiner

U.S. Cl. X.R.

274—2; 312—325, 322

PO-1050
(5/69)

UNITED STATES PATENT OFFICE
CERTIFICATE OF CORRECTION

Patent No. 3,552,816 Dated January 5, 1971

Inventor(s) Gerald L. Wolanin

It is certified that error appears in the above-identified patent and that said Letters Patent are hereby corrected as shown below:

Column 6, lines 56 and 57 (Claim 1 lines 12 and 13)

After "enclosure" delete "and said record player when said speaker enclosure"

Column 6, line 69 (Claim 2 line 5)

After "erally" delete "upright storage position and a generally"

Column 8 line 10 (Claim 9)

After "means" change "eduring" to --during--.

Signed and sealed this 30th day of March 1971.

(SEAL)
Attest:

EDWARD M.FLETCHER,JR.
Attesting Officer

WILLIAM E. SCHUYLER, J
Commissioner of Patent